US007169201B2

(12) United States Patent
Oh et al.

(10) Patent No.: US 7,169,201 B2
(45) Date of Patent: Jan. 30, 2007

(54) CYCLONE SEPARATING APPARATUS AND A VACUUM CLEANER HAVING THE SAME

(75) Inventors: Jang-keun Oh, Gwangju (KR); Jung-gyun Han, Busan (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 28 days.

(21) Appl. No.: 10/840,248

(22) Filed: May 7, 2004

(65) Prior Publication Data

US 2005/0050865 A1 Mar. 10, 2005

(30) Foreign Application Priority Data

Sep. 8, 2003 (KR) ..................... 10-2003-0062520

(51) Int. Cl.
*B01D 45/12* (2006.01)

(52) U.S. Cl. ........................... 55/343; 55/349; 55/426; 55/459.1; 55/DIG. 3; 15/350; 15/353

(58) Field of Classification Search ................. 55/343, 55/346, 348, 349, 426, 459.1, DIG. 3; 15/350, 15/353
See application file for complete search history.

(56) References Cited

U.S. PATENT DOCUMENTS 1,416,885 A 5/1922 Schreiner
2,511,387 A * 6/1950 Watson et al. .............. 209/712
2,553,175 A * 5/1951 Davenport et al. ........... 55/343
3,769,781 A * 11/1973 Klein et al. .................... 96/372
6,238,451 B1 5/2001 Conrad et al.
6,746,500 B1 * 6/2004 Park et al. ..................... 55/343
2002/0066366 A1 6/2002 Conrad et al.

FOREIGN PATENT DOCUMENTS

| | | | |
|---|---|---|---|
| CN | 1389175 | A | 1/2003 |
| FR | 2619498 | A1 | 2/1989 |
| GB | 835884 | A | 5/1960 |
| GB | 1 207 034 | | 9/1970 |
| GB | 2 374 305 | | 10/2002 |
| GB | 2 377 656 | A | 1/2003 |
| GB | 2 375 980 | | 8/2003 |
| JP | 52-014775 | | 2/1977 |
| JP | 2002-051951 | | 2/2002 |

(Continued)

OTHER PUBLICATIONS

Combined Search and Examination Report issued by the British Patent Office in connection with Application No. GB 0412903.7.

(Continued)

*Primary Examiner*—Robert A. Hopkins
(74) *Attorney, Agent, or Firm*—Blank Rome, LLP

(57) ABSTRACT

A cyclone separating apparatus and a vacuum cleaner having the same are disclosed. More specifically, the cyclone separating apparatus for a vacuum cleaner comprises a first cyclone for separating drawn-in air, and a plurality of second cyclones installed on an outer periphery of the first cyclone to enclose the first cyclone. Accordingly, because a plurality of the cyclones separates dust, and a bulky structure is improved to a compact structure, suction force deterioration does not occur, and, dust-collecting efficiency is increased.

22 Claims, 6 Drawing Sheets

FOREIGN PATENT DOCUMENTS

| | | |
|---|---|---|
| JP | 2002-172077 | 6/2002 |
| JP | 2003-116752 | 4/2003 |

OTHER PUBLICATIONS

Russian Patent Office Action issued in connection with the corresponding application No. 2004120073.

Chinese Patent Office, Office Action Issued Jan. 20, 2006 in connection with Chinese Patent Application No. 200410049219.7 filed on Jun. 2, 2004.

Spanish Patent Office, State of the Art Report issued Apr. 17, 2006 with respect to Spanish Patent Application No. 200401753 filed on Jul. 16, 2004.

Japanese Patent Office, Office Action issued Jun. 20, 2006 with respect to Japanese Patent Application No. 2004-46393 filed on Feb. 23, 2004.

German Patent Office, Office Action issued Jul. 11, 2006 with respect to German Patent Application No. 102004028678.7 filed on Jun. 14, 2004.

* cited by examiner

CYCLONE SEPARATING APPARATUS AND A VACUUM CLEANER HAVING THE SAME

REFERENCE TO RELATED APPLICATION

This application claims priority to Korean Application No. 2003-62520, filed Sep. 8, 2003, in the Korean Intellectual Property Office, the disclosure of which is incorporated herein by reference.

CROSS-REFERENCE TO RELATED APPLICATIONS

This application is related to applications entitled "Cyclone Separating Apparatus and Vacuum Cleaner having the same" (U.S. application Ser. No. 10/840,230, filed May 7, 2004), "Cyclone Dust Separating Apparatus and Vacuum Cleaner having the same" (U.S. application Ser. No. 10/840,231, filed May 7, 2004), and "Cyclone Separating Apparatus and Vacuum Cleaner Equipped with the same" (U.S. application Ser. No. 10/840,229, filed May 7, 2004, now U.S. Pat. No. 7,097,680, issued Aug. 29, 2006), whose disclosures are commonly owned by the same assignee as the present application and are entirely incorporated herein by reference.

FIELD OF THE INVENTION

The present invention is generally related to a cyclone separating apparatus and vacuum cleaner having the same, and, more particularly, is related to a cyclone separating apparatus comprising a first cyclone and a plurality of second cyclones in which the second cyclones are installed on the outer periphery of the first cyclone to enclose the first cyclone, and a vacuum cleaner having the same.

BACKGROUND OF THE INVENTION

Generally, the cyclone separating apparatus is an apparatus for separating dust and dirt using centrifugal force by generating rotational current inside the cyclone chamber, and is widely used in a variety of fields. U.S. Pat. Nos. 3,425,192 and 4,373,228 disclose embodiments adopting such cyclone separating apparatus to the vacuum cleaner.

The above patents disclose a cyclone dust-collecting apparatus for separating dust from air using a plurality of cyclones. In the construction, large dust particles, or dirt, is separated by the first cyclone, and air from which dust or dirt has been separated flows into the second cyclone or the auxiliary cyclone. Accordingly, small dust particles or dirt, are separated, and purified air is discharged to the outside. U.S. Pat. No. 3,425,192 discloses that the auxiliary cyclone is arranged on the upper part of the first cyclone so that large dust particles are separated by the first cyclone, which is a main cyclone, and partially purified air flows into the auxiliary cyclone so that small dust particles are then separated. U.S. Pat. No. 4,373,228 discloses a plurality of cyclone units formed in a manner that the auxiliary cyclones are installed inside the first cyclone.

The conventional cyclone separating apparatus, however, has some problems. First, since the connecting structure between the first cyclone and the auxiliary cyclone is complicated, and a suction force generated from a main body of the vacuum cleaner is difficult to be properly delivered, the suction force and cleaning efficiency is deteriorated. Secondly, since the first cyclone and the auxiliary cyclone are not compactly arranged, the cyclone separating apparatus indispensably requires a big volume to properly perform an appropriate dust-collecting function. Accordingly, the vacuum cleaner with the above cyclone separating apparatus is large in its structure, the cleaner is difficult to keep, and the cleaning task is inconvenient to a user. Thirdly, since a connection path between the first cyclone and the auxiliary cyclone is complicated, a production process is complicated. Therefore, the number of parts and production costs are increased.

Thus, a heretofore unaddressed need exists in the industry to address the aforementioned deficiencies and inadequacies.

SUMMARY OF THE INVENTION

An object of the present invention is to solve at least the above problems and/or disadvantages and to provide at least the advantages described below. Accordingly, an object of the present invention is to provide a cyclone separating apparatus with a compact structure that is capable of improving dust-collecting efficiency in a plurality of the conventional cyclone dust-collecting apparatuses, and prevents deterioration of suction force, and a vacuum cleaner having the same.

In order to achieve the above-described aspects of the present invention, a cyclone separating apparatus is provided for a vacuum cleaner comprising a first cyclone for separating air drawn-in and a plurality of second cyclones installed on an outer periphery of the first cyclone to enclose the first cyclone.

In a preferred embodiment of the present invention, the first cyclone comprises a first chamber for separating dust-ladened air using centrifugal force, a first inlet formed on the first chamber to which dust-ladened air flows, and a first outlet formed on the first chamber from which air is discharged. The first chamber can be formed in a cylindrical shape. The first cyclone further comprises a grill member positioned inside the cyclone chamber and installed upstream of the first outlet to circumvent if dust and dirt separated from absorbed air should flow backward through the first outlet.

The grill member may comprise a grill body with a plurality of channels. A grill opening is formed on one side of the grill body for discharging air from which dust or dirt has been separated by communicating with the first outlet. A shielding member is formed on the other side of the grill body for preventing dust from flowing backward.

Each of the second cyclones includes a second chamber for further separating air separated by the first cyclone using centrifugal force, a second inlet formed at the second chamber, to which air discharged from the first cyclone flows, and a second outlet formed at the second chamber for discharging air from which dust has been separated. The second chamber is formed such that a predetermined part on one end includes a conical shape. The cyclone separating apparatus may further include an inlet-outlet cover installed on the upper part of the first cyclone and the second cyclones for communication between the first outlet of the first cyclone and the second inlet of the second cyclone. A cyclone cover may be installed on the upper part of the inlet-outlet cover. The inlet-outlet cover includes an air channel for connecting the first outlet to the second inlet, and, may have an outlet channel for communicating with the second outlet of the second cyclone.

A predetermined portion of the outlet channel is inserted into the second outlet when the inlet-outlet cover is connected to the second cyclone so that air is discharged through the outlet channel. The outlet channel is configured in such a way that one end is connected to the second outlet of the second cyclone and other end is open in the upper direction of the inlet-outlet cover. The inlet-outlet cover also has, in its center, an integral-type channel for allowing air discharged from each of the outlet channels to form one discharging current. Also, the integral-type channel may have an opening on its upper part. The cyclone cover includes a conical shape of which up and down spaces are open, and the first cyclone and each of the second cyclones may be integrally formed. A partition is installed between the second cyclones.

The foregoing and other objects and advantages are realized by providing a vacuum cleaner which includes a vacuum cleaner main body for generating a suction force by absorbing dust-ladened air, a suction brush for vacuuming dust from a bottom which is a surface to be cleaned using the suction force and communicating with the vacuum cleaner main body, and, a cyclone separating apparatus installed in the vacuum cleaner main body. The cyclone separating apparatus includes a first cyclone and a plurality of second cyclones for separating absorbed air, and the second cyclones are installed on the outer periphery of the first cyclone to enclose the first cyclone.

In a preferred embodiment of the present invention, the first cyclone includes a first chamber for separating dust-ladened air using centrifugal force, a first inlet formed on the first chamber, to which dust-ladened air flows, and a first outlet formed on the first chamber from which air is discharged. Each of the second cyclones includes a second chamber for further separating air separated by the first cyclone using centrifugal force, a second inlet formed at the second chamber to which air discharged from the first cyclone flows, and, a second outlet formed at the second chamber, for discharging air from which dust has been separated.

Other systems, methods, features, and advantages of the present invention will be or become apparent to one skilled in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The above object and other features of the present invention will become more apparent by describing in detail a certain embodiment thereof with reference to the attached drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Certain embodiments of the present invention will now be described with reference to the accompanying drawings.

Figure 3:
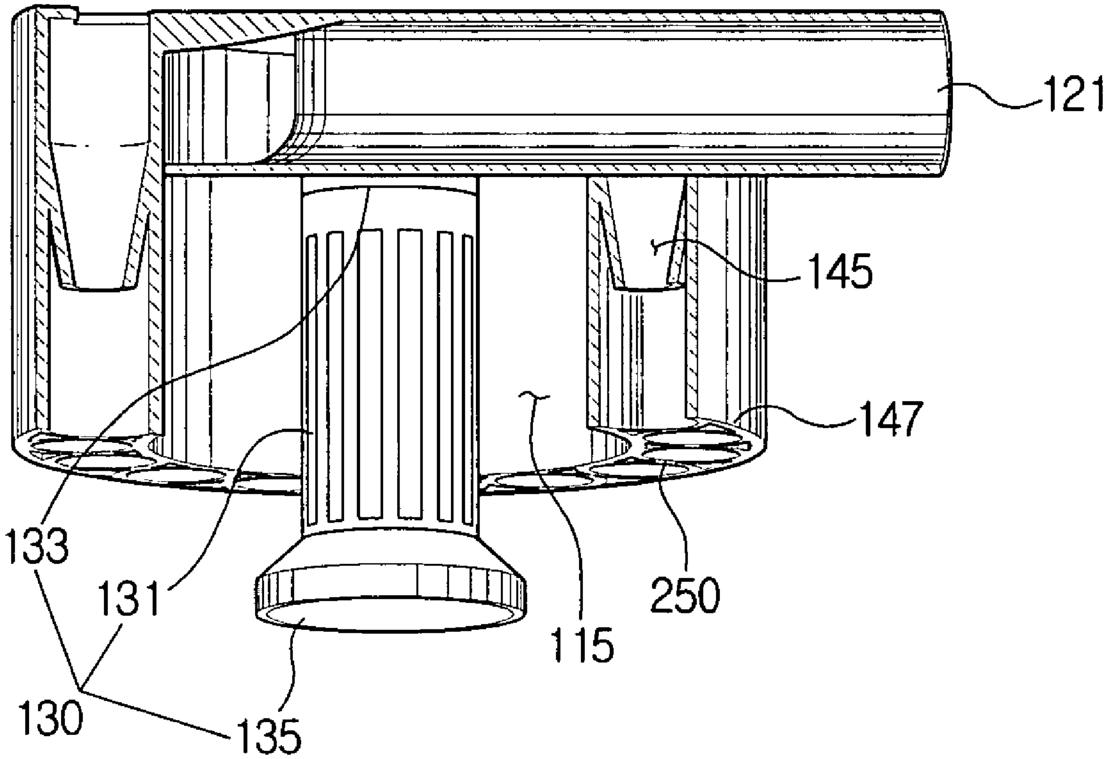
FIG. 3 is a drawing of a partially cross-sectional perspective view of a cyclone separating apparatus according to an embodiment of the present invention.
Figure 5:
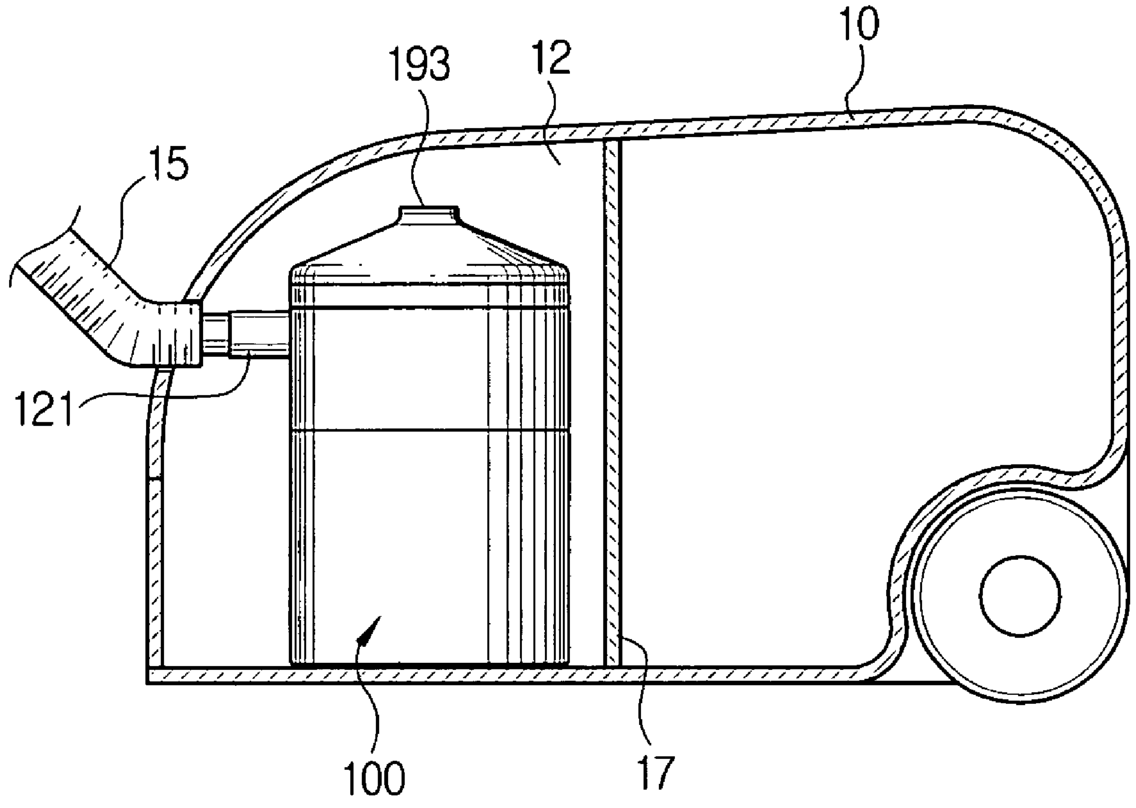
FIG. 5 is a drawing of a cross-sectional view of a canister-type vacuum cleaner adopting a cyclone separating apparatus according to an embodiment of the present invention.
Figure 6:
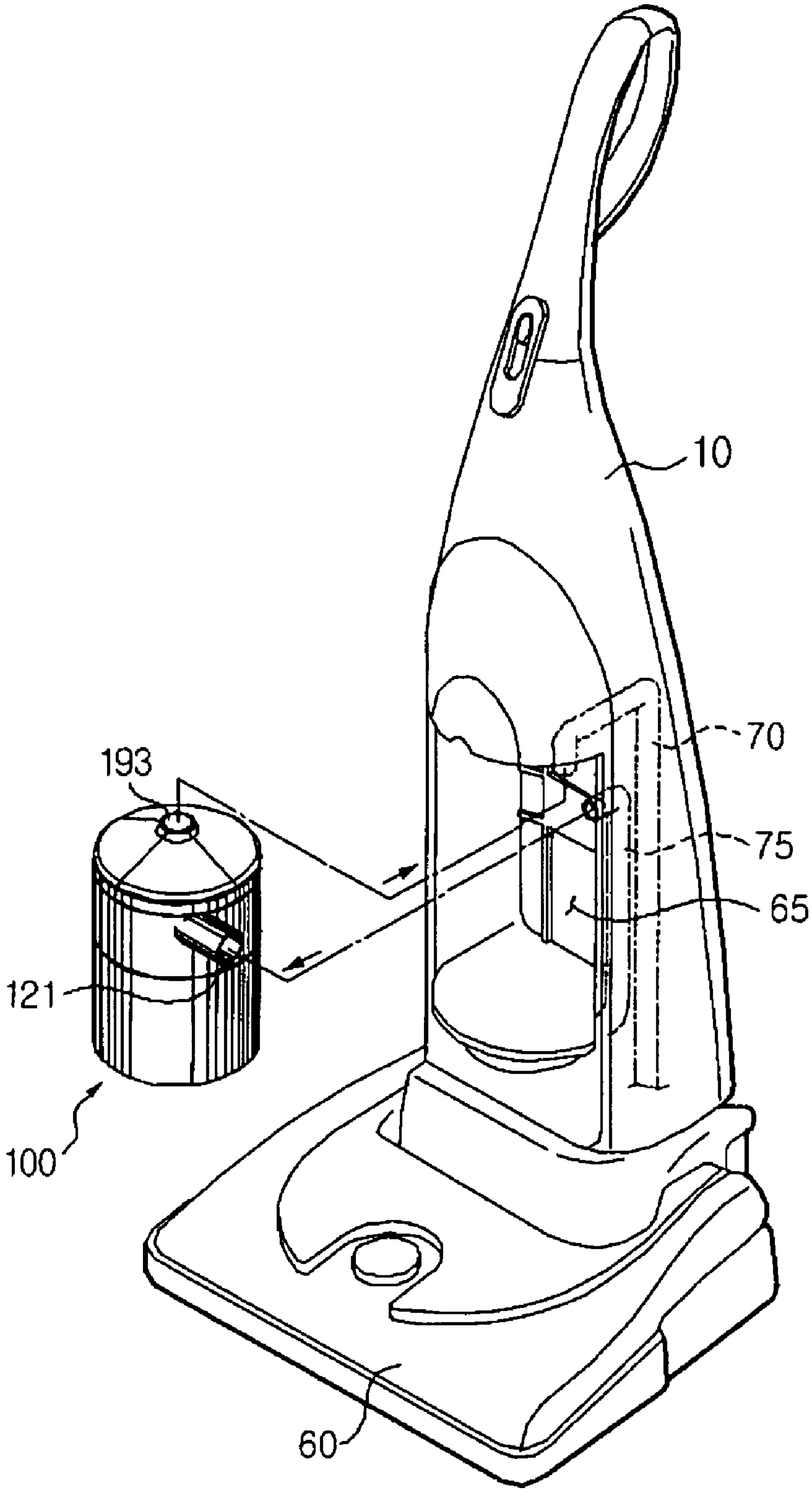
FIG. 6 is a drawing of a perspective view of an upright-type vacuum cleaner adopting a cyclone separating apparatus according to an embodiment of the present invention.

The cyclone separating apparatus according to the present invention includes, a first cyclone 111, a plurality of second cyclones 113, an inlet-outlet cover 190 installed on the upper part of the first cyclone 111 and the second cyclones 113, a cyclone cover 191, and a dust collecting unit 165. A plurality of the second cyclones 113 are installed on the outer periphery of the first cyclone 111 to enclose the first cyclone 111. The first cyclone 111 and each of the second cyclones 113 are integrally formed, and a partition 250 is installed between the second cyclones 113, as shown in FIG. 3. The partition 250 partitions space between the second cyclones 113 to form the cyclone separating apparatus 100. A chamber wall 147 is formed in a cylindrical shape around the second cyclones 113. The chamber wall 147 can be formed with a variety of polygonal shapes depending on a structure of the chamber wall 147 structured into a body 10 of the vacuum cleaner (FIGS. 5 and 6).

The first cyclone 111 comprises a first chamber 115, a first inlet 121, a first outlet 123, and a grill member 130. The first chamber 115 is formed in a cylindrical shape and separates dust-ladened air using centrifugal force by generating a rotational current. The grill member 130 is installed in the upstream of the first outlet 123. Using the grill member 130, dust separated from vacuumed air does not flow backward through the first outlet 123. The grill member 130 includes a grill body 131 with a plurality of channels, a grill opening 133, and a shielding member 135. The grill opening 133 is formed on one side of the grill body 131 in communication with the first outlet 123 to discharge air from which dust or dirt has been separated. The shielding member 135 is formed on the other side of the grill body 131 to prevent the separated dust or dirt from flowing backward.

The second cyclone 113 includes a second chamber 145, a second inlet 141, and a second outlet 143. The second chamber 145 is formed in a way that a part on one end is a conical shape and separates dust-ladened air using centrifugal force. Air discharged from the first cyclone 111 flows into the second inlet 141, and, air separated by the second chamber 145 is discharged to the second outlet 143.

The inlet-outlet cover 190 is installed on the upper part of the first and second cyclones 111 and 113, and includes an air channel 197 for communication between the first outlet 123 of the first cyclone 111 and the second inlet 141 of the second cyclone 113, and, an outlet channel 199. The outlet channel 199 communicates with the second outlet 143 of the second cyclone 113, and is inserted into the second outlet 143 of the second cyclone 113. When the inlet-outlet cover 190 is connected to the second cyclone 113, a predetermined portion of the outlet channel 199 is inserted into the second outlet 143 so purified air can be discharged through the outlet channel 199. One end of the outlet channel 199 is connected to the second outlet 143 of the second cyclone 113 and the other end is open in the upper direction of the inlet-outlet cover 190. The cyclone cover 191 is formed in a conical shape of which up and down spaces are open, and installed in a detachable manner on the upper part of the inlet-outlet cover 190. If air discharged from the second outlet 143 of the second cyclone 113 accumulates, air is discharged to the outside of the cyclone separating apparatus 100 through an upper opening 193 formed on the upper space of the cyclone cover 191.

The dust collecting unit 165 includes a first dirt-collecting bucket 161 and a second dirt-collecting bucket 163 wherein the first dirt-collecting bucket 161 is formed integrally with the second dirt-collecting bucket 163. The second dirt-collecting bucket 163 is formed in a cylindrical tube, and detachably connected to the chamber wall 147 formed on the outside of the second cyclone 113. The first dirt-collecting bucket 161 is formed in a cylindrical tube and is installed inside the second dirt-collecting bucket 163, and is detachably connected to the first chamber 115 of the first cyclone 111.

Figure 4:
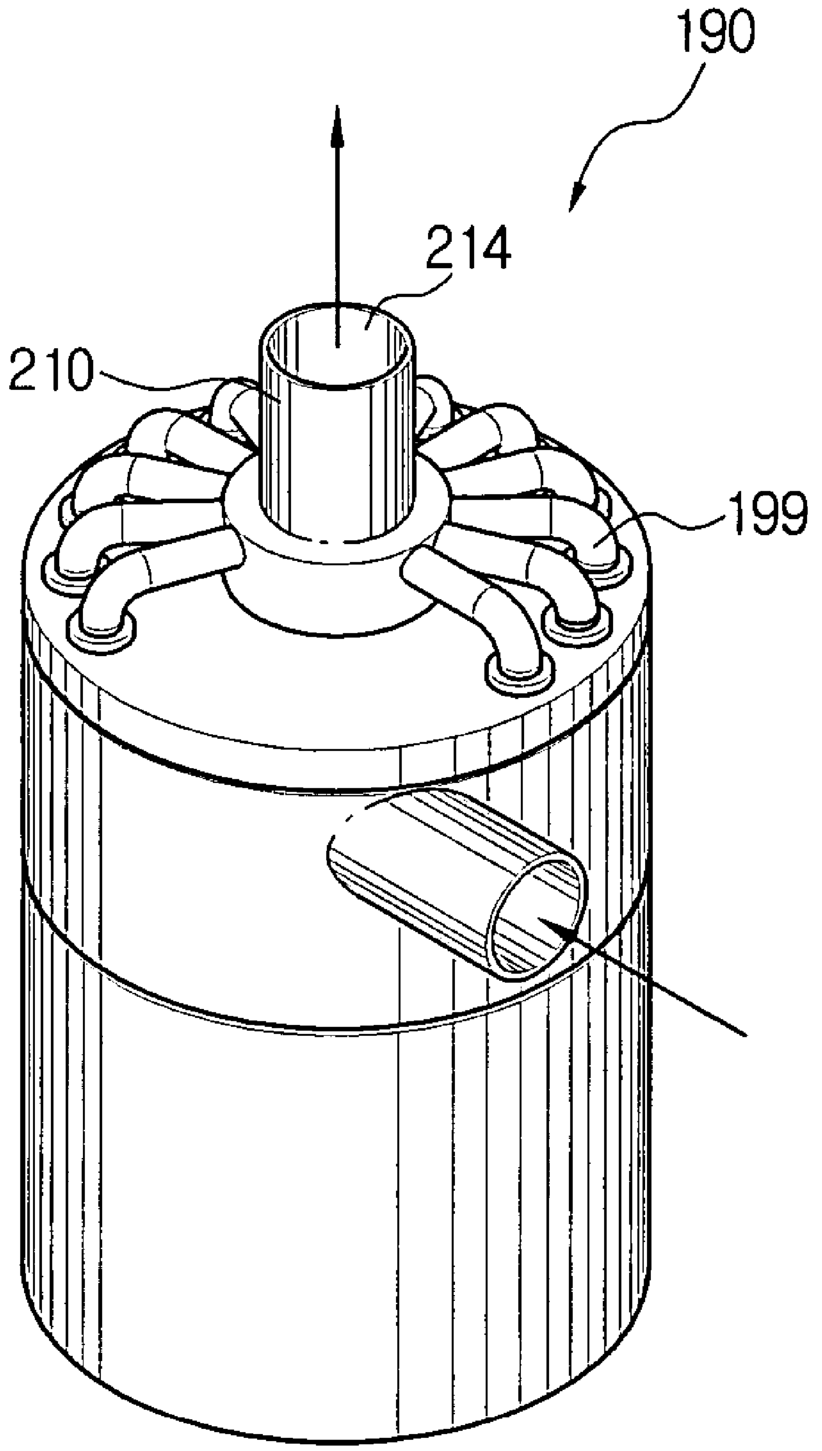
FIG. 4 is a drawing of a perspective view showing a cyclone separating apparatus according to an embodiment of the present invention.

FIG. 4 shows another embodiment of a cyclone separating apparatus according to the present invention, wherein the only difference is the shape of the inlet-outlet cover, and without requiring cyclone cover 191. Referring to FIG. 4, outlet channels 199 of an inlet-outlet cover 190 are extended from the second outlets 143, respectively, corresponding to each of the second outlet 143 of the second cyclone 113. One end of each outlet channel 199 is connected to the second outlet 143, extended from the second outlet 143, and connected to one integral-type channel 212 at the center of the inlet-outlet cover 190. At the upper part of the integral-type channel 212, an opening 214 is formed. Accordingly, discharged air forms a single discharged current in the integral-type channel 212.

As shown in FIG. 5, a dust-collecting room 12 is separated and partitioned by a partition 17 in one side in the interior of the main body 10, and a cyclone separating apparatus 100 is positioned inside the dust-collecting room 12. On an upper one side of the periphery of the cyclone separating apparatus 100, a first inlet 121 for drawing-in air and dirt drawn into the cyclone separating apparatus 100 through a flexible hose 15 of the vacuum cleaner as the suction force is generated by a motor (not shown), is formed. In addition, at the central part on the upper end of the cyclone separating apparatus 100, an upper opening 193 for discharging upward air from which dust and dirt have been separated by centrifugal force, amongst dust-ladened air and dirt which is drawn into the cyclone separating apparatus 100, is formed. The cyclone separating apparatus 100 can be adapted to the upright-type vacuum cleaner as well as the canister-type vacuum cleaner, and the vacuum cleaner adopting the cyclone separating apparatus 100 will be described with reference to FIG. 6 below.

A vacuum generating apparatus (not shown), a motor operating part, is prepared inside the main body 10. Also, a suction brush 60 is movably connected to the lower side of the main body 10, and a cyclone mounting part 65 is prepared on the front center of the main body 10. An air vacuuming channel 70 for connecting to the suction brush 60, and an air discharging channel 75 for connecting to the motor operating part, are prepared inside the cyclone mounting part 65.

The first inlet 121 of the cyclone separating apparatus 100 communicates with the air vacuuming channel 70, and the upper opening 193 communicates with the air discharging channel 75, so that dust and dirt are separated while dust-ladened air drawn-in through the suction brush 60 is passing through the cyclone separating apparatus 100, and, purified air is discharged to the outside by the upper opening 193 and the air discharging channel 75.

Operations of the cyclone separating apparatus 100 with the above construction, and the vacuum cleaner having the same, will be described with reference to FIG. 1 through FIG. 6 below.

If the suction force is generated at the main body 10, a suction brush 60 connected to the vacuum cleaner main body 10, draws-in dust-ladened-air from the bottom, which is a surface to be cleaned, using the suction force. The drawn-in air in this manner flows into the first chamber 115 in tangential direction along the first inlet 121 of the cyclone separating apparatus 100, and is separated by the first cyclone 111 using centrifugal force, so that large dust particles are collected at the first dirt-collecting bucket 161. More specifically, the first cyclone 111 separates large dust particles or dirt by absorbing dust-ladened air using suction force generated from the vacuum cleaner main body 10. The first chamber 115 of the first cyclone 111 generates centrifugal force by rotating air flowing through the first inlet 121, along the inner wall of the first chamber 115 in tangential direction with respect to the first chamber. Therefore, since air of relatively light weight is given a small centrifugal force, air gathers to the central portion of the first chamber 115, generates a whirlwind, and is discharged, flowing (discharging current) in the direction of the first outlet 123. On the contrary, since dirt, relatively heavier than air, is given a big centrifugal force, the dirt flows along the inner wall of the first chamber 115, and is collected at the first dirt-collecting bucket 161.

Meanwhile, air from which large dust particles or dirt have been separated, flows through the first outlet 123 of the first chamber 115, passes by the air channel 197, and finally flows into the second chamber 145 in a tangential direction through the second inlet 141 of the second cyclone 113. Since the air channel 197 is distributed in a radial shape from the center, a big air stream from which dust and dirt have been separated changes into a small air stream. Accordingly, the air separation process at the second cyclone 113 is easily performed. Air that has flowed into the second chamber 145 is further separated by centrifugal force, so that small dust particles, or dirt, are collected at the second dirt-collecting bucket 163. Fine dust particles are collected at the second dirt-collecting bucket 163 by a plurality of the second cyclones 113.

The partition 250 formed between the second cyclones 113 prevents dust from flowing backward in some extent, and makes the collection of dust less cumbersome when the separated dust falls down to the second dirt-collecting bucket 163.

Figure 1:
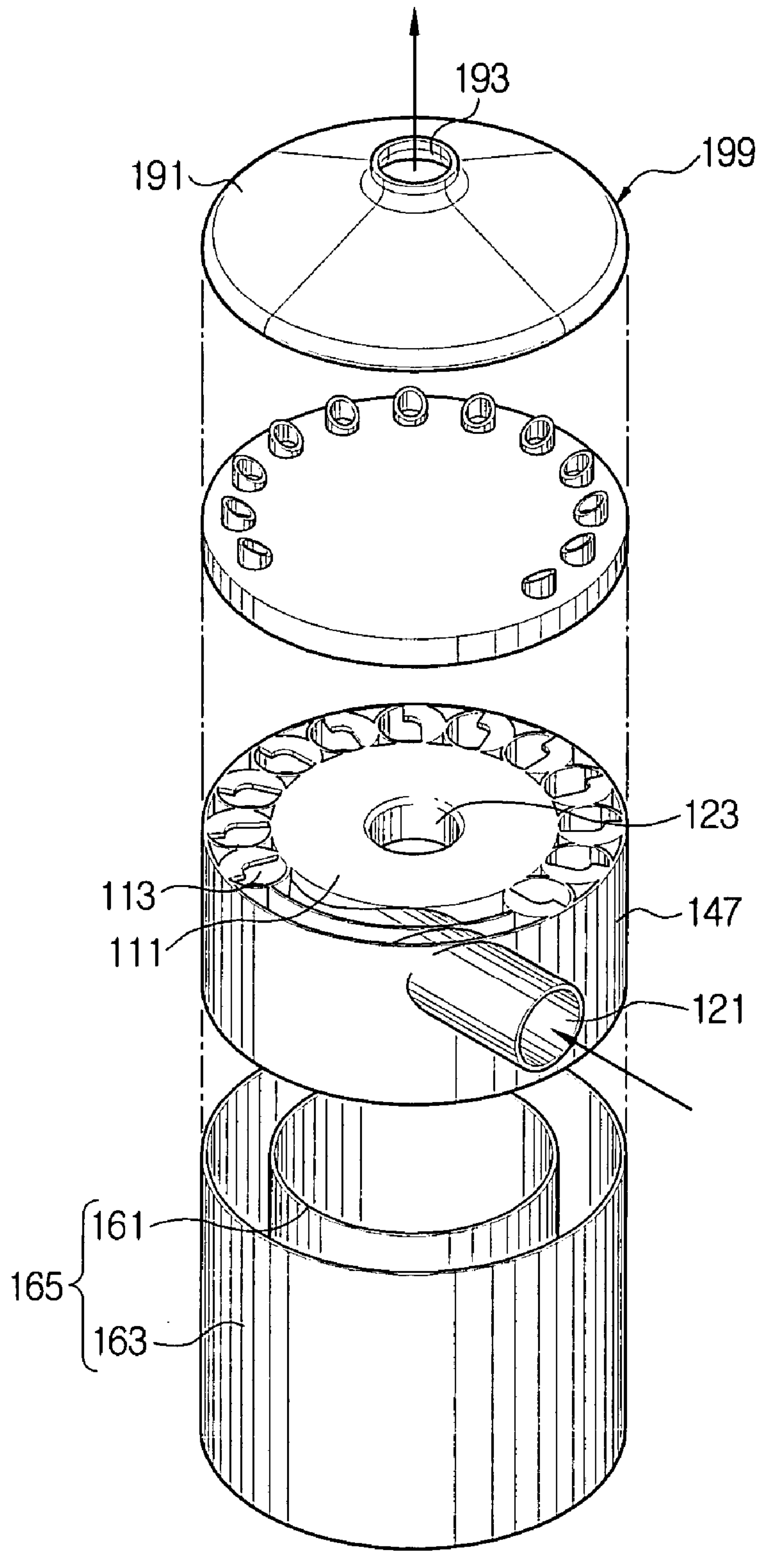
FIG. 1 is a drawing showing an exploded perspective view of a crucial part in a cyclone separating apparatus according to an embodiment of the present invention.
Figure 2:
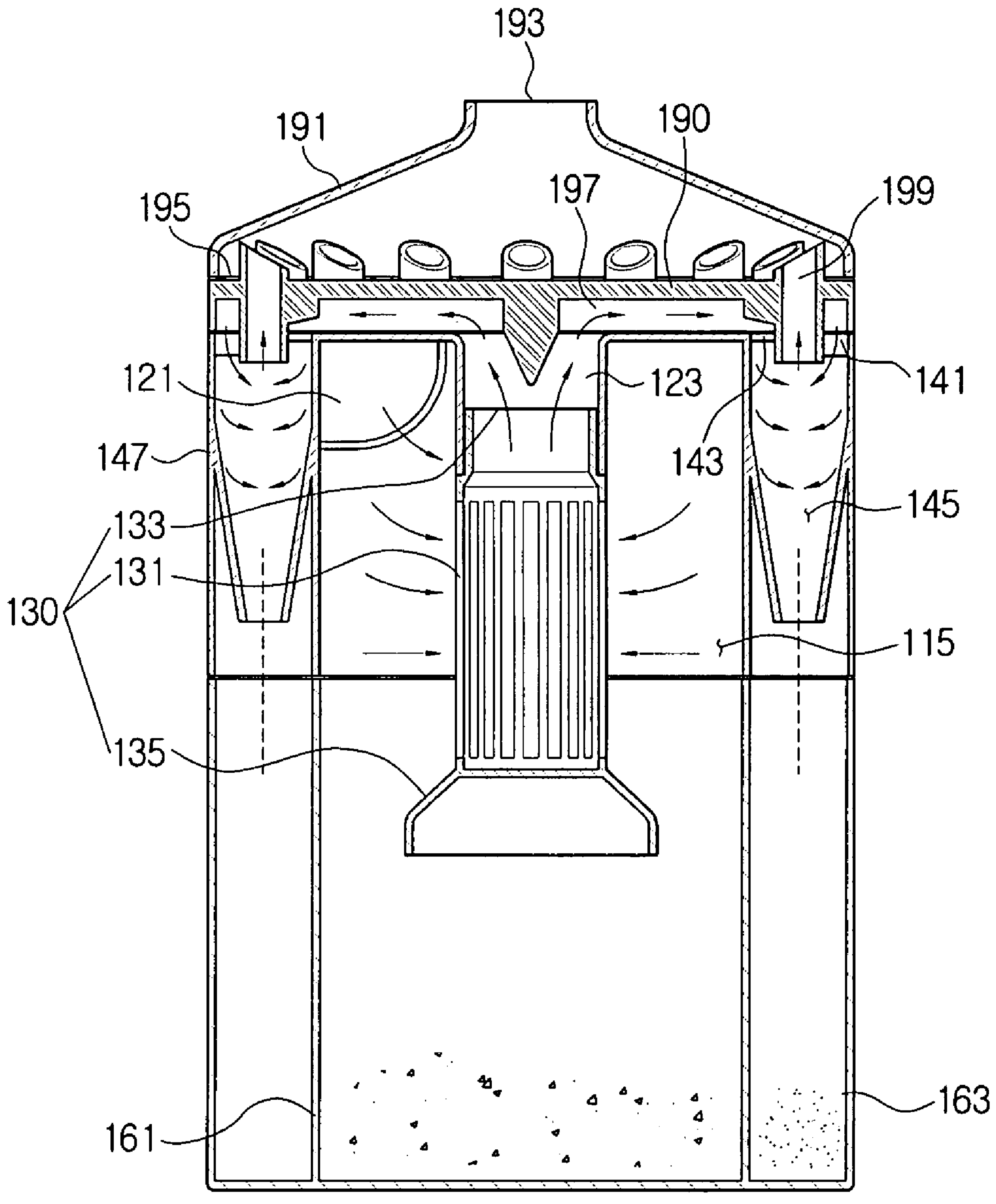
FIG. 2 is a cross-sectional drawing of a view of a cyclone separating apparatus according to an embodiment of the present invention.

Air, further separated using centrifugal force, flows through the second outlet 143 of the second cyclone 113, passes by the outlet channel 199 of the inlet-outlet cover 190, gathers at the cyclone cover 191, and is finally discharged through the upper opening 193 formed at the upper part of the cyclone cover 191 (refer to FIG. 2). Referring to FIG. 4, air flows through the outlet channel 199 of the inlet-outlet cover 190, passes by the integral-type channel 212, gathers into one air stream, and is finally discharged through the opening 214 of the integral-type channel 212. Hence, the second cyclone 113 separates fine dust particles or dirt again from air that has been primarily separated by the first cyclone 111. Specifically, the cyclone separating apparatus 100 improves dust-collecting efficiency by performing the primary separation process at the first cyclone 111, and performing the secondary separation process at a plurality of the second cyclones 113.

In the cyclone separating apparatus 100, the distance between the first outlet 123 of the first cyclone 111 and the second inlet 141 of the second cyclone 113 is reduced as compared to the patents quoted in the description of the related art, so that suction force deterioration is prevented, and dust-collecting efficiency is improved. Air discharged from the cyclone separating apparatus 100 through such a process is discharged to the outside through the vacuum cleaner main body 10.

As is apparent from the above, while the conventional cyclone separating apparatus has a problem of low dust-collecting efficiency, and, has a limit, to some extent, in preventing deterioration of the suction force, in the claimed invention, the second cyclones are arranged along the outer periphery of the first cyclone, and, the structure is compact. Accordingly, deterioration in the suction force does not occur, and dust-collecting efficiency is improved. Therefore, since the structure is compact and occupies a smaller space without a deterioration in dust-collecting efficiency, a cyclone separating apparatus, and a vacuum cleaner with the same, can be provided that are satisfactory in viewpoint of user preference, thus raising product competitiveness even more.

While the invention has been shown and described with reference to certain preferred embodiments thereof, it will be understood by those skilled in the art, that various changes in form and details may be made therein without departing from the spirit and scope of the invention as defined by the appended claims. Therefore, all such proper modifications, changes and equivalents of the embodiments of the present invention will fall within the scope of the invention.

What is claimed is:

1. A cyclone separating apparatus for a vacuum cleaner, comprising:
- a first cyclone for separating drawn-in air;
- a plurality of second cyclones; and
- a grill member installed at the first cyclone,
- wherein the second cyclones are installed on an outer periphery of the first cyclone so as to enclose the first cyclone.

2. The apparatus according to claim 1, wherein the first cyclone comprises:
- a first chamber for centrifugally separating air including dust;
- a first inlet formed on the first chamber, into which air including dust flows; and
- a first outlet formed on the first chamber, from which air is discharged.

3. The apparatus according to claim 2, wherein the first chamber is cylindrically shaped.

4. The apparatus according to claim 2, wherein the grill member is installed upstream of the first outlet in the cyclone chamber to prevent dust and dirt separated from drawn-in air from flowing back through the first outlet.

5. The apparatus according to claim 4, wherein the grill member comprises:
- a grill body having a plurality of channels;
- a grill opening formed on one side of the grill body, for discharging air from which dust or dirt has been separated, by communicating with the first outlet; and
- a shielding member formed on the other side of the grill body, for preventing dust or dirt from flowing backward.

6. The apparatus according to claim 2, wherein each of the second cyclones comprises:
- a second chamber for further separating air separated by the first cyclone by centrifugal force;
- a second inlet formed at the second chamber, into which air discharged from the first cyclone flows; and
- a second outlet formed at the second chamber, for discharging air from which dust has been separated.

7. The apparatus according to claim 6, wherein the second chamber is formed with a predetermined part on one end with a conical shape.

8. The apparatus according to claim 6, wherein the cyclone separating apparatus further comprises:
- an inlet-outlet cover installed on an upper part of the first cyclone and the second cyclones, for communication between the first outlet of the first cyclone and the second inlet of the second cyclone; and
- a cyclone cover installed on an upper part of the inlet-outlet cover.

9. The apparatus according to claim 8, wherein the inlet-outlet cover has an air channel for connecting the first outlet to the second inlet, and an outlet channel for communicating with the second outlet of the second cyclone.

10. The apparatus according to claim 9, wherein a predetermined portion of the outlet channel is inserted into the second outlet when the inlet-outlet cover is connected to the second cyclone so air is discharged through the outlet channel.

11. The apparatus according to claim 10, wherein the outlet channel is configured so one end is connected to the second outlet of the second cyclone and the other end is open upward with respect to the inlet-outlet cover.

12. The apparatus according to claim 11, wherein the inlet-outlet cover further comprises an integral-type channel for allowing air discharged from each of the outlet channels, to form one discharging current in the center.

13. The apparatus according to claim 12, wherein the integral-type channel has an opening on an upper part.

14. The apparatus according to claim 8, wherein the cyclone cover includes a conical shape of which up and down spaces are open.

15. The apparatus according to claim 1, wherein the first cyclone and each of the second cyclones are integrally formed.

16. The apparatus according to claim 1, wherein partitions are installed between the second cyclones.

17. A vacuum cleaner comprising:
- a vacuum cleaner main body for generating suction force by drawing-in dust-ladened air;
- a suction brush for drawing-in dust from a bottom, which is a surface to be cleaned, using the suction force, and communicating with the vacuum cleaner main body; and
- a cyclone separating apparatus installed in the vacuum cleaner main body,
- wherein the cyclone separating apparatus comprises a first cyclone, a plurality of second cyclones for separating drawn-in air, and a grill positioned at the first cyclone, and the second cyclones are installed on an outer periphery of the first cyclone to enclose the first cyclone.

18. The vacuum cleaner according to claim 17, wherein the first cyclone comprises:
- a first chamber for separating air including dust using centrifugal force;
- a first inlet formed on the first chamber, into which dust-ladened air flows; and
- a first outlet formed on the first chamber, from which air is discharged.

19. The vacuum cleaner according to claim 17, wherein each of the second cyclones comprises:

a second chamber for further separating air separated by the first cyclone using centrifugal force;

a second inlet formed at the second chamber, into which air discharged from the first cyclone flows; and a second outlet formed at the second chamber, for discharging air from which dust has been separated.

20. A vacuum cleaner, comprising:

at least one brush configured to draw in debris and air from a surface to be cleaned;

at least one first cyclone configured to separate at least a first portion of the debris from the air; and a plurality of second cyclones configured to separate at least a second portion of the debris from the air, wherein the plurality of second cyclones are positioned surrounding a periphery of the at least one first cyclone, and wherein the at least one first cyclone and the plurality of second cyclones are contained in a main body of the vacuum cleaner.

21. A cyclone separating apparatus for a vacuum cleaner, comprising:

a first cyclone for separating drawn-in air; and a plurality of second cyclones, wherein the second cyclones are installed on an outer periphery of the first cyclone so as to enclose the first cyclone, and wherein the first cyclone and each of the second cyclones are integrally formed.

22. A cyclone separating apparatus for a vacuum cleaner, comprising:

a first cyclone for separating drawn-in air; and a plurality of second cyclones, wherein the second cyclones are installed on an outer periphery of the first cyclone so as to enclose the first cyclone, and wherein partitions are installed between the second cyclones.

* * * * *